United States Patent
Saffre et al.

(10) Patent No.: US 9,930,109 B2
(45) Date of Patent: Mar. 27, 2018

(54) METHODS AND SYSTEMS FOR WORKLOAD DISTRIBUTION

(71) Applicants: Khalifa University of Science, Technology, and Research, Abu Dhabi (AE); British Telecommunications plc, London (GB); Emirates Telecommunications Corporation, Abu Dhabi (AE)

(72) Inventors: Fabrice Saffre, Abu Dhabi (AE); Hanno Hildmann, Abu Dhabi (AE); Sebastien Matthieu Rene Nicolas, Abu Dhabi (AE)

(73) Assignees: Khalifa University of Science, Technology and Research, Abu Dhabi (AE); British Telecommunications plc, London (GB); Emirates Telecommunications Corporation, Abu Dhabi (AE)

( * ) Notice: Subject to any disclaimer, the term of this patent is extended or adjusted under 35 U.S.C. 154(b) by 175 days.

(21) Appl. No.: 14/821,218

(22) Filed: Aug. 7, 2015

(65) Prior Publication Data
US 2017/0041387 A1    Feb. 9, 2017

(51) Int. Cl.
G06F 15/173   (2006.01)
H04L 29/08    (2006.01)
G06F 9/50     (2006.01)
G06F 1/20     (2006.01)
G06F 1/32     (2006.01)

(52) U.S. Cl.
CPC .......... H04L 67/1008 (2013.01); G06F 1/206 (2013.01); G06F 1/3206 (2013.01); G06F 9/5094 (2013.01)

(58) Field of Classification Search
CPC ....... H04L 67/1008; G06F 1/20; G06F 9/5094
See application file for complete search history.

(56) References Cited

U.S. PATENT DOCUMENTS

| 6,363,490 | B1  | 3/2002 | Senyk |
| 6,950,773 | B1* | 9/2005 | Gross ...................... G01K 7/42 374/E7.042 |
| 8,631,411 | B1* | 1/2014 | Ghose ..................... G06F 1/206 361/676 |

(Continued)

OTHER PUBLICATIONS

Gillan, P.A.; "Fresh air-natural asset [telecommunication equipment cooling]," Telecommunications Energy Conference, 2002. TNTELEC. 24th Annual International, vol., No., pp. 470-477, 2002.

(Continued)

*Primary Examiner* — Moustafa M Meky
*Assistant Examiner* — Blake Rubin
(74) *Attorney, Agent, or Firm* — Calfee, Halter & Griswold, LLP

(57) ABSTRACT

This invention relates to methods and systems for workload distribution, particularly in data centers, more particularly data centers which use fresh air cooling. Embodiments of the invention provide methods and systems which calculate a load value for each server which takes account of both the temperature of the server and its current job queue, and determine the server to which an incoming job should be allocated on the basis of the load values of the available servers.

10 Claims, 4 Drawing Sheets

(56) References Cited

U.S. PATENT DOCUMENTS

| | | | | |
|---|---|---|---|---|
| 2006/0047808 | A1* | 3/2006 | Sharma | G06F 9/505 709/224 |
| 2009/0064164 | A1* | 3/2009 | Bose | G06F 1/206 718/105 |
| 2009/0100437 | A1* | 4/2009 | Coskun | G06F 9/5027 718/105 |
| 2009/0276095 | A1 | 11/2009 | Pienta | |
| 2009/0276528 | A1* | 11/2009 | Pienta | G06F 1/206 709/226 |
| 2009/0292811 | A1* | 11/2009 | Pienta | G06F 1/206 709/226 |
| 2010/0010688 | A1* | 1/2010 | Hunter | G06F 1/206 700/300 |
| 2010/0217454 | A1* | 8/2010 | Spiers | G05D 23/1932 700/300 |
| 2011/0231860 | A1* | 9/2011 | Kazama | G06F 9/5094 718/105 |
| 2012/0041600 | A1* | 2/2012 | Michael | G05D 23/1932 700/276 |
| 2013/0047013 | A1* | 2/2013 | Day | G06F 9/5094 713/320 |
| 2013/0317654 | A1* | 11/2013 | Kashirajima | F24F 11/0009 700/276 |
| 2014/0297038 | A1* | 10/2014 | Nishioka | G06F 1/206 700/275 |
| 2014/0317267 | A1* | 10/2014 | Ramachandran | H04L 41/24 709/224 |

OTHER PUBLICATIONS

Prithviraj Banerjee, Chandrakant Patel, Cullen Bash, Amip Shah, and Martin Arlitt. 2012. Towards a net-zero data center. J. Emerg. Technol. Comput. Syst. 8, 4, Article 27 (Nov. 2012), 39 pages.

Lei Li, Chieh-Jan Mike Liang, Jie Liu, Suman Nath, Andreas Terzis, and Christos Faloutsos. 2011. ThermoCast: a cyber-physical forecasting model for datacenters. In Proceedings of the 17th ACM SIGKDD international conference on Knowledge discovery and data mining (KDD '11). ACM, New York, NY, USA, 1370-1378.

Andy Woods. 2010. Cooling the Data Center. Queue 8, 3, pp. 10 (Mar. 2010), 10 pages.

Luca Parolini, Niraj Tolia, Bruno Sinopoli, and Bruce H. Krogh. 2010. A cyber-physical systems approach to energy management in data centers. In Proceedings of the 1st ACM/IEEE International Conference on Cyber-Physical Systems (ICCPS '10). ACM, New York, NY, USA, 168-177.

Yogendra Joshi, Pramod Kumar, 2012. Energy Efficient Thermal Management of Data Centers, in Emerging Data Center Thermal Management and Energy Efficiency Technologies Springer 2012, pp. 569-611 Print ISBN 978-1-4419-7123-4.

D. Atwood and J. G. Miner. Reducing Data Center Cost with an Air Economizer, 2008. http://www.intel.com/it/pdf/Reducing_Data)Center_Cost_with_an_Air Economizer.pdf.

Mikko Pervila and Jussi Kangasharju. 2011. Cold air containment. In Proceedings of the 2nd ACM SIGCOMM workshop on Green networking (GreenNets '11). ACM, New York, NY, USA, 7-12.

C. Belady. Intense Computing or in Tents Computing?, 2008. http://blogs.msdn.com/b/the_power_of_software/archive/2008/09/19/intense-computing-or-in-tents-computing.aspx.

Patterson, M.K.; "The effect of data center temperature on energy efficiency," Thermal and Thermomechanical Phenomena in Electronic Systems, 2008. ITHERM 2008. 11th Intersociety Conference on, vol., No., pp. 1167-1174, May 28-31, 2008.

Sena Seneviratne et al: "Division of Load for Operating System Kernel," Sep. 27, 2012, pp. 88-94.

Zheng Zhou et al: Scheduling for Multi-Core Processor under Process and Temperature Variation, Sep. 20, 2012, pp. 113-120.

International Search Report and Written Opinion from PCT/GB2015/052292, dated Apr. 26, 2016.

* cited by examiner

METHODS AND SYSTEMS FOR WORKLOAD DISTRIBUTION

FIELD OF THE INVENTION

The present invention relates to methods and systems for workload distribution. It is particularly, but not exclusively, concerned with workload distribution in data centers, in particular data centers that use fresh air cooling.

BACKGROUND OF THE INVENTION

Fresh air cooling [7] [1] is a rapidly spreading technique [6] to lower the PUE (Power Usage Effectiveness) of datacentres [2] by lowering the requirements for active cooling [5] with powered chillers [4]. It essentially combines using hardware capable of operating at higher temperatures with a ventilating system that relies solely or primarily on fresh air (i.e. at ambient outside temperature [9]) [8].

In these conditions, there is usually a region of the parameters space (workload, heat generation/dissipation rates . . . ) for which an isolated server will reach its critical temperature and need to idle in order to cool down to an acceptable level (resumption threshold). For a fixed job arrival rate, this will typically lead to an oscillation between the busy and idling states (and an ever-increasing queue of unprocessed jobs).

With active cooling [3] (or, more generally, without idling time), minimising delays is trivial and is best achieved by sending incoming jobs to the server with the shortest local queue (assuming they are all identical with respect to processing capability). Note that if jobs are all of the same size/duration, then the same result can be obtained by using a simple round-robin rule.

With fresh air cooling however (or, more generally, when servers may become temporarily unavailable as a direct result of their past activity) the problem becomes much more complex because the system has a memory. In summary: the "shortest queue" or "round-robin" strategy may be sub-optimal. This is intuitively understandable; for instance, it is typical for a server to have a short queue at the end of a period of intense activity. However, it will also be running very hot and potentially close to initiating a "cool down" phase, making it a poor choice for the allocation of a newly arrived job. Yet considering the temperature alone is also a bad idea: at the end of its idling period ("cool down" phase), a server will be close to its lower resumption threshold temperature, and may therefore appear as an optimal choice. However, it may still have a long queue of (partially) unprocessed jobs, which would also cause unwanted delays in the execution of the newcomer.

An object of the present invention is to provide a method to balance the workload between multiple servers so as to minimise their aggregated cooling-related idling time (and hence the delay incurred by queuing jobs) where the serves use exclusively fresh air cooling.

A further object of the present invention is to provide a method for distributing incoming jobs across a population of servers so as to maximise their aggregated processing capacity over a period of time in the absence of active refrigeration.

SUMMARY OF THE INVENTION

An exemplary embodiment of the invention provides a method for allocating jobs to a plurality of servers, wherein the jobs are tasks to be performed by the servers, the method comprising the steps of: receiving a job to be allocated; determining information relating to the state of each of the servers, the information comprising the temperature of each server and the amount of tasks allocated to the server and still to be performed by the server; calculating a thermal load of each server using the information from the servers; choosing the server to allocate the job to according to the calculated thermal loads of the servers; and allocating the job to the chosen server.

A further exemplary embodiment of the invention provides a system for allocating jobs to a plurality of servers, wherein the jobs are tasks to be performed by the servers, the system including: a load balancer; a plurality of servers, each having a temperature sensor arranged to measure the temperature of the server; and a network connecting said servers, wherein the system is arranged to: determine information relating to the state of each of the servers, the information comprising the temperature of each server and the amount of tasks allocated to the server and still to be completed by the server; and calculate a thermal load of each server using the information, and the load balancer is arranged to: receive a job to be allocated; choose a server to allocate the job to according to the calculated thermal loads of the servers; and allocate the job to the chosen server.

A further exemplary embodiment of the invention provides a load balancing device for allocating jobs to a plurality of servers, wherein the jobs are tasks to be performed by the servers, the load balance device having a processor and being arranged to: receive a job to be allocated to a server, and receive information from each of the servers, the information comprising the temperature of the server, and the amount of tasks allocated to the server and still to be completed by the server, and wherein the processor: calculates a thermal load of each server using the information from the servers; chooses a server to allocate the job to according to the calculated thermal loads of the servers; and allocates the job to said chosen server.

BRIEF DESCRIPTION OF THE DRAWINGS

Embodiments of the invention will now be described by way of example with reference to the accompanying drawings in which.

DETAILED DESCRIPTION

Figure 1:
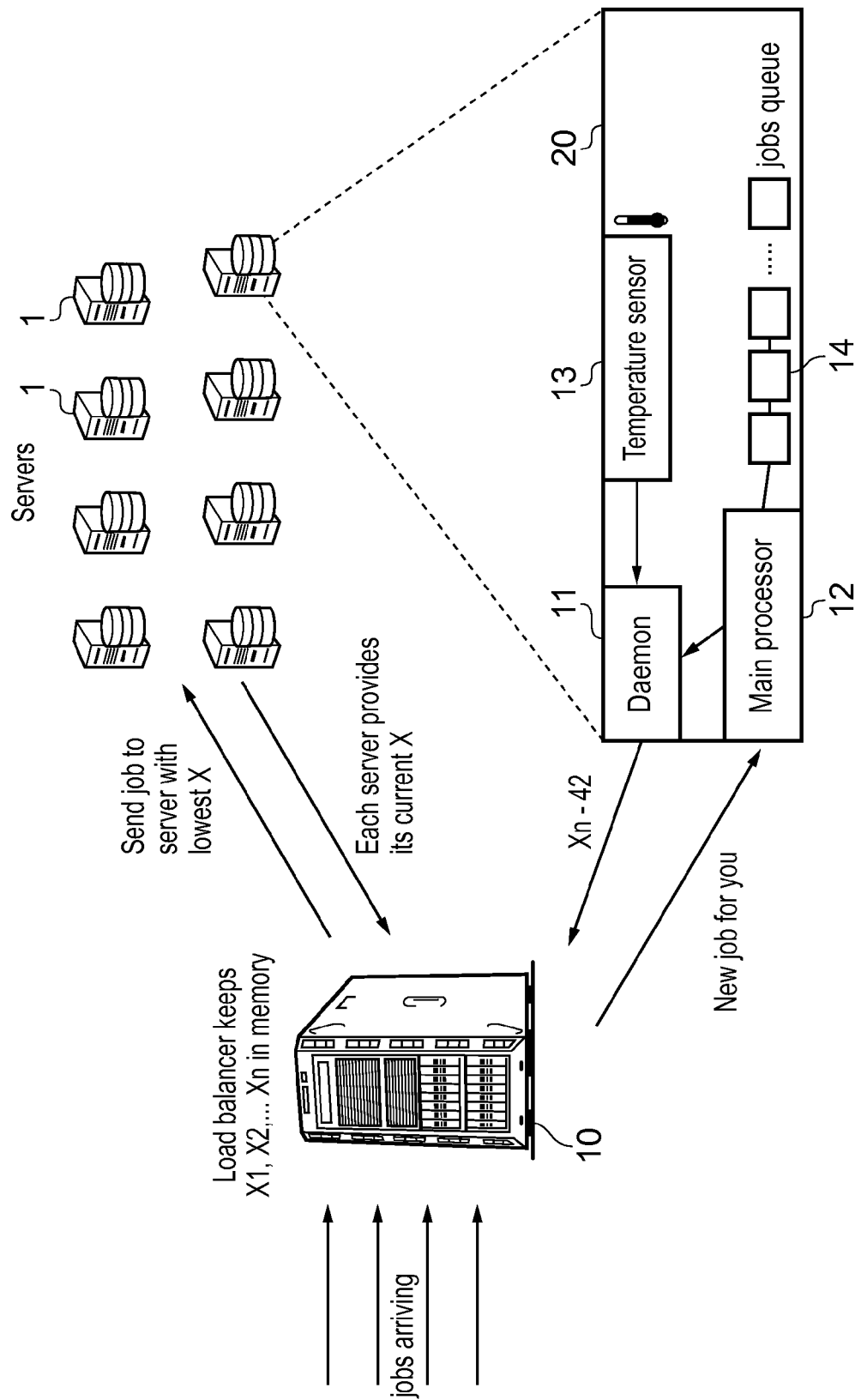
FIG. 1 shows, in schematic form, a system according to an embodiment of the present invention.

At their broadest, aspects of the present invention provide for methods and systems devices for distributing jobs between a plurality of servers which take account of both the temperature of the servers and the amount of tasks allocated to the servers.

A first aspect of the present invention provides a method for allocating jobs to a plurality of servers, wherein the jobs are tasks to be performed by the servers, the method comprising the steps of: receiving a job to be allocated; determining information relating to the state of each of the servers, the information comprising the temperature of each server and the amount of tasks allocated to the server and still to be performed by the server; calculating a thermal load of each server using the information from the servers; choosing the server to allocate the job to according to the calculated thermal loads of the servers; and allocating the job to the chosen server.

Calculating a thermal load of each server which is based on both the temperature of the server and the amount of tasks allocated to the server, allows the method to take account of not only the current temperature state of the server (which is directly measurable) but also the likely temperature state of the server when the server reaches the stage of processing the job being allocated. By comparing these thermal loads, the allocation of incoming jobs between the servers can be improved and preferably optimized.

The jobs will typically be data processing tasks which are to be processed by the processors or processor cores of the servers.

The servers may be identical in their processing speed/capacity, but if there are differences (for example because some servers have more processors/processor cores than others), then these differences can be taken into account when calculating the thermal load. Such differences may form part of the information determined in the method of the present aspect.

The calculation of the thermal load and/or the allocation of the job may take into account further information or further factors, such as the state of each server, any planned downtime for the server or whether certain jobs are required to be performed on certain servers.

The amount of tasks allocated to a server may be defined in terms of the number of jobs or, more preferably, the expected processing time. In most situations, jobs arriving for processing will have different processing requirements in terms of CPU time and so it is advantageous if the allocation process is able to take account of this.

Preferably the servers are located in a data centre which is cooled by fresh air cooling alone (no active cooling apparatus is used). The method of this aspect may be used to prevent the servers from entering an active/idling oscillation of the servers as they cool down or at least increase the job processing capacity of the data centre which can be reached before such oscillation commences.

However, the method of this aspect may also be used in conjunction with servers which are cooled by active cooling, by reducing the amount of active cooling required by determining the job allocation between the servers to ensure that they do not overheat and/or that the amount of active cooling required is reduced (compared to other allocation methods) or preferably optimized.

Preferably the step of choosing chooses the server with the lowest calculated thermal load. This should ensure that, at least in approximate terms, the thermal load is balanced across the servers and will therefore allocate the incoming job to the server. Thereby the likelihood of one or more of the servers having to enter an idle state to cool down or require active cooling can be reduced and preferably minimized.

Preferably the temperature of the server which is determined is the temperature of a CPU in the server. However, other temperatures, such as the temperature of the motherboard or bios, may also be used.

The calculation of the thermal load may be carried out by each server based on the information determined about that server and the thermal loads communicated to a central load balancing device (or to a selected one of the servers which has been selected to carry out job allocation). Alternatively, the servers may send the information to the central load balancing device (or selected server) which performs the calculations for all of the servers.

The method may include the further step of storing the thermal load of each server. The information and/or the thermal loads may be updated each time that a new job arrives, or it may be periodically determined. This may be by way of "polling" the servers, or by the servers sending the information and/or thermal loads out on a regular basis.

The method may also include the further steps of: switching a server to an idle state if the temperature of that server exceeds an upper temperature threshold; and switching a server in an idle state to an active state when the server temperature reaches a lower temperature threshold.

Idling a server which is above an upper threshold temperature allows the server to cool down and is the usual option adopted where fresh air cooling is used. The server can then be reactivated once it reaches a lower temperature threshold and continue processing tasks. However, unless the rate of job arrival decreases, idling a server will typically lead to a continuous oscillation between the busy and idling states (and an ever-increasing queue of unprocessed jobs).

In certain embodiments of the present invention, the thermal load of each server is calculated as: $ThermalLoad=Temperature \times e^{queueLength}$ wherein queueLength is a representation of the amount of tasks allocated to the server and still to be performed by the server. queueLength may be the number of tasks awaiting processing by the server, which will be an effective measure where the jobs are of essentially the same or similar processing times. However, where the jobs can be of variable lengths, queueLength is preferably the scheduled or estimated processing time of all the tasks awaiting processing, thus allowing the thermal load calculation to take account of the varying length of the jobs that might be assigned to different servers.

This particular calculation of the thermal load provides an estimation of the server temperature after the queue is cleared or, in other words, provides an estimation of the total thermal energy of the server which includes both the explicit thermal energy in terms of the temperature and the implicit thermal energy which is condensed in the queue of allocated but unprocessed jobs. Therefore, by using this calculation of the thermal load, the method can allocate the job to the server which currently has the coolest 'effective' temperature or minimum total thermal energy and avoid allocations to servers which have either a short queue but high temperature, or which are coolest, but have a lot of stored processing (and therefore stored temperature).

The method of the present aspect may include any combination of some, all or none of the above described preferred and optional features.

The method of the above aspect is preferably implemented by a system or a load balance device according to the second or third aspects of this invention, as described below, but need not be.

Further aspects of the present invention include computer programs for running on computer systems which carry out the method of the above aspect, including some, all or none of the preferred and optional features of that aspect.

A second aspect of the present invention provides a system for allocating jobs to a plurality of servers, wherein the jobs are tasks to be performed by the servers, the system including: a load balancer; a plurality of servers, each having a temperature sensor arranged to measure the temperature of the server; and a network connecting said servers, wherein the system is arranged to: determine information relating to the state of each of the servers, the information comprising the temperature of each server and the amount of tasks allocated to the server and still to be completed by the server; and calculate a thermal load of each server using the information, and the load balancer is arranged to: receive a job to be allocated; choose a server to allocate the job to according to the calculated thermal loads of the servers; and allocate the job to the chosen server.

Calculating a thermal load of each server which is based on both the temperature of the server and the amount of tasks allocated to the server, allows the system to take account of not only the current temperature state of the server (which is directly measurable) but also the likely temperature state of the server when the server reaches the stage of processing the job being allocated. By comparing these thermal loads, the allocation of incoming jobs between the servers can be improved and preferably optimized.

The jobs will typically be data processing tasks which are to be processed by the processors or processor cores of the servers.

The servers may be identical in their processing speed/capacity, but if there are differences (for example because some servers have more processors/processor cores than others), then these differences can be taken into account when calculating the thermal load. Such differences may form part of the information determined in the system of the present aspect.

The calculation of the thermal load and/or the allocation of the job may take into account further information or further factors, such as the state of each server, any planned downtime for the server or whether certain jobs are required to be performed on certain servers.

The amount of tasks allocated to a server may be defined in terms of the number of jobs or, more preferably, the expected processing time. In most situations, jobs arriving for processing will have different processing requirements in terms of CPU time and so it is advantageous if the allocation process is able to take account of this.

Preferably the load balancer chooses the server with the lowest calculated thermal load to allocate the job to. This should ensure that, at least in approximate terms, the thermal load is balanced across the servers and will therefore allocate the incoming job to the server. Thereby the likelihood of one or more of the servers having to enter an idle state to cool down or require active cooling can be reduced and preferably minimized.

The temperature sensors preferably measure the temperature of a CPU in each server. However, other temperatures, such as the motherboard or bios temperature, may also be used.

Each server may have a processor which performs the calculation of the thermal load based on the information determined about that server. The thermal loads thus calculated can be communicated to the load balancer in order for the load balancer to allocate the incoming job. Alternatively, the servers may send the information to the load balancer which has a processor which performs the calculations for all of the servers.

The load balancer may further include a memory for storing the thermal load of each server. The information and/or the thermal loads may be updated each time that a new job arrives, or it may be periodically determined. This may be by way of "polling" the servers, or by the servers sending the information and/or thermal loads out on a regular basis.

If the temperature of a server exceeds an upper temperature threshold, the server may be configured to switch to an idle state until the server temperature reaches a lower temperature threshold when it is configured to switch to an active state. This switching may be performed automatically by the server, or may be subject to central control. The switching may take account of further factors (for example, switching to an idle state may only occur between the processing of jobs so that the server never leaves a job partially complete before switching to the idle state).

Idling a server which is above an upper threshold temperature allows the server to cool down and is the usual option adopted where fresh air cooling is used. The server can then be reactivated once it reaches a lower temperature threshold and continue processing tasks. However, unless the rate of job arrival decreases, idling a server will typically lead to a continuous oscillation between the busy and idling states (and an ever-increasing queue of unprocessed jobs).

Preferably the servers are located in a data centre which is cooled by fresh air cooling alone (no active cooling apparatus is used). The system of this aspect may prevent the servers from entering an active/idling oscillation of the servers as they cool down or at least increase the job processing capacity of the data centre which can be reached before such oscillation commences.

However, the system of this aspect may also include active cooling apparatus which actively cools a server which has exceeded a temperature threshold. In such a system, the amount of active cooling required can be reduced by determining the job allocation between the servers to ensure that they do not overheat and/or that the amount of active cooling required is reduced (compared to other allocation methods) or preferably optimized.

In certain embodiments of the present invention, the thermal load of each server is calculated as: ThermalLoad=Temperature$\times e^{queueLength}$ wherein queueLength is a representation of the amount of tasks allocated to the server and still to be performed by the server. queueLength may be the number of tasks awaiting processing by the server, which will be an effective measure where the jobs are of essentially the same or similar processing times. However, where the jobs can be of variable lengths, queueLength is preferably the scheduled or estimated processing time of all the tasks awaiting processing, thus allowing the thermal load calculation to take account of the varying length of the jobs that might be assigned to different servers.

This particular calculation of the thermal load provides an estimation of the server temperature after the queue is cleared or, in other words, provides an estimation of the total thermal energy of the server which includes both the explicit thermal energy in terms of the temperature and the implicit thermal energy which is condensed in the queue of allocated but unprocessed jobs. Therefore, by using this calculation of the thermal load, the system can allocate the job to the server which currently has the coolest 'effective' temperature or minimum total thermal energy and avoid allocations to servers which have either a short queue but high temperature, or which are coolest, but have a lot of stored processing (and therefore stored temperature).

The load balancer may be a separate device, or it may form part of a management computer or similar computer which is connected to the servers. Alternatively, the load balancer may be part of one of the servers which has been selected to carry out job allocation.

The system of the present aspect may include any combination of some, all or none of the above described preferred and optional features.

A third aspect of the present invention provides a load balancing device for allocating jobs to a plurality of servers, wherein the jobs are tasks to be performed by the servers, the load balancing device having a processor and being arranged to: receive a job to be allocated to a server, and receive information from each of the servers, the information comprising the temperature of the server, and the amount of tasks allocated to the server and still to be completed by the server, and wherein the processor: calculates a thermal load of each server using the information from the servers; chooses a server to allocate the job to according to the calculated thermal loads of the servers; and allocates the job to said chosen server.

Calculating a thermal load of each server which is based on both the temperature of the server and the amount of tasks allocated to the server, allows the load balancing device to take account of not only the current temperature state of the server (which is directly measurable) but also the likely temperature state of the server when the server reaches the stage of processing the job being allocated. By comparing these thermal loads, the allocation of incoming jobs between the servers can be improved and preferably optimized.

The jobs will typically be data processing tasks which are to be processed by the processors or processor cores of the servers.

The servers may be identical in their processing speed/capacity, but if there are differences (for example because some servers have more processors/processor cores than others), then these differences can be taken into account when calculating the thermal load. Such differences may form part of the information determined in the system of the present aspect.

The calculation of the thermal load and/or the allocation of the job may take into account further information or further factors, such as the state of each server, any planned downtime for the server or whether certain jobs are required to be performed on certain servers.

The amount of tasks allocated to a server may be defined in terms of the number of jobs or, more preferably, the expected processing time. In most situations, jobs arriving for processing will have different processing requirements in terms of CPU time and so it is advantageous if the allocation process is able to take account of this.

Preferably the load balancing device chooses the server with the lowest calculated thermal load to allocate the job to. This should ensure that, at least in approximate terms, the thermal load is balanced across the servers and will therefore allocate the incoming job to the server. Thereby the likelihood of one or more of the servers having to enter an idle state to cool down or require active cooling can be reduced and preferably minimized.

The temperatures of the servers are preferably the temperature of a CPU in the server. However, other temperatures, such as the motherboard or bios temperature, may also be used.

The load balancing device may further include a memory for storing the thermal load of each server. The information and/or the thermal loads may be updated each time that a new job arrives, or it may be periodically determined. This may be by way of "polling" the servers, or by the servers sending the information out on a regular basis.

Preferably the servers are located in a data centre which is cooled by fresh air cooling alone (no active cooling apparatus is used). The load balancing device of this aspect may prevent the servers from entering an active/idling oscillation of the servers as they cool down or at least increase the job processing capacity of the data centre which can be reached before such oscillation commences.

However, the load balancing device of this aspect may also operate in data centres which have active cooling apparatus which actively cools the servers. In such a system, the amount of active cooling required can be reduced by determining the job allocation between the servers to ensure that they do not overheat and/or that the amount of active cooling required is reduced (compared to other allocation methods) or preferably optimized.

In certain embodiments of the present invention, the thermal load of each server is calculated as: $ThermalLoad = Temperature \times e^{queueLength}$ wherein queueLength is a representation of the amount of tasks allocated to the server and still to be performed by the server. queueLength may be the number of tasks awaiting processing by the server, which will be an effective measure where the jobs are of essentially the same or similar processing times. However, where the jobs can be of variable lengths, queueLength is preferably the scheduled or estimated processing time of all the tasks awaiting processing, thus allowing the thermal load calculation to take account of the varying length of the jobs that might be assigned to different servers.

This particular calculation of the thermal load provides an estimation of the server temperature after the queue is cleared or, in other words, provides an estimation of the total thermal energy of the server which includes both the explicit thermal energy in terms of the temperature and the implicit thermal energy which is condensed in the queue of allocated but unprocessed jobs. Therefore, by using this calculation of the thermal load, the system can allocate the job to the server which currently has the coolest 'effective' temperature or minimum total thermal energy and avoid allocations to servers which have either a short queue but high temperature, or which are coolest, but have a lot of stored processing (and therefore stored temperature).

The load balancing device may be a separate device, or it may form part of a management computer or similar computer which is connected to the servers. Alternatively, the load balancing device may be part of one of the servers which has been selected to carry out job allocation.

The load balance device of the present aspect may include any combination of some, all or none of the above described preferred and optional features.

FIG. 1 shows the system diagram of a typical system according to an embodiment of the present invention which is controlled by a method according to an embodiment of the present invention, such as that set out below.

A plurality of servers 1 are connected to a network (not shown). A load balancer 10 is responsible for allocating arriving jobs between the servers. The load balancer 10 may be a selected one of said servers, or it may be a separate computer with a dedicated management function.

Each of the servers 1 has a processor (or multiple processors) 20 which carries out jobs assigned to the server 1 by the load balancer 10. These jobs are carried out by main process 12 and, where multiple jobs are assigned to the server, subsequent jobs are stored in a queue 14.

The processor runs a daemon 11, which continuously receives an input from a temperature sensor 13 which reads the temperature from the the server. Ideally the temperature sensor 13 will measure the temperature of the least temperature tolerant and/or most temperature impacted electronic component (this will be the CPU temperature in most situations, but more heat-tolerant CPUs are being developed and so it may be the motherboard or bios). The daemon 11 also communicates with the main process 12 (via interprocess communication such as dbus on Linux) to obtain the length of the queue 14 (the number of jobs awaiting execution on the particular server). The daemon also obtains the state of the machine (idle or busy).

The daemon 11 calculates its load value X and sends it to the central load balancer 10, either via regular push updates or on-demand pull requests from the balancer 10. This information is sent by a protocol such as SNMP.

Alternatively, the daemon 11 may provide the raw information (temperature, queue length and state) to the central load balancer 10 by a similar mechanism.

The load balancer stores the load values of each server 1 in a table in its memory.

Alternatively, if it has received raw information from the servers 1, the load balancer 10 may use the aggregated information from each server to compute individual load values X either when the data is received (in which case these values are stored in a table in the balancer's memory) or may compute the individual load values X of each server in real-time.

When a new job arrives, the load balancer 10 consults the information held and sends the job to the server 1 with the smallest X.

To test the methods for calculating the load values X according to embodiments of the invention, a number of simulations were carried out.

Simulation Results:

The simulations were based on the following scenario:
  There is a fixed population of servers, each of them generating heat [6] at two different rates depending on its state (lower when idling, higher when busy) [5]
  Servers passively dissipate heat at a rate linearly proportional to the temperature difference with the environment [4] (i.e., all things being equal, faster when the environment is colder [10])
  Servers have a maximum safe operational temperature (critical threshold) [3] [10]. When a server reaches/exceeds it, the server immediately enters idling mode until it has cooled down to a lower temperature (resumption threshold)
  While idling, the jobs allocated to a server are not being processed. There is no limit to the incurred delay (i.e. no hard deadline)
  Allocation is immediate and final: upon arrival, a job is directly sent to a server and will remain in the corresponding queue until processed (i.e. no central queue or transfer between servers)

The determination of the load value in methods according to an embodiment of the invention includes the two variables, queue length (which may be defined in terms of the number of jobs or, more preferably, the expected processing time of the allocated jobs) and temperature, into the decision function that will determine where to send the new job.

In one embodiment of the invention, the load value of each server is calculated as:

$$X = \text{temperature} \times e^{queuelength} \quad [1]$$

It was found that choosing the server that minimises the above load value X offers the best performance in the fresh air cooling scenario characterized by the working hypotheses described above.

A first batch of tests was conducted using a constant job arrival rate (fixed probability). Four different allocation strategies were evaluated:
  "Coolest": the job is sent to the server advertising the lowest temperature
  "Idlest": the job is sent to the server advertising the shortest queue
  "Round Robin": jobs are sent to servers in a repeating (circular) sequence
  "Smart": the job is sent to the server advertising the lowest load value X (Eq. [1]), i.e. a method according to an embodiment of the present invention.

Figure 2A:
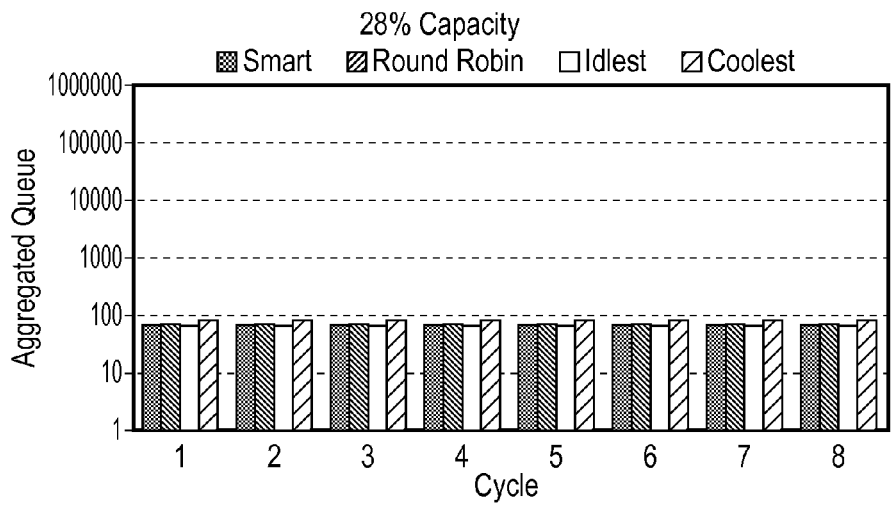
FIGS. 2a-2c show the longest aggregated queue per cycle for simulations of four allocation algorithms at different workloads.
Figure 2B:
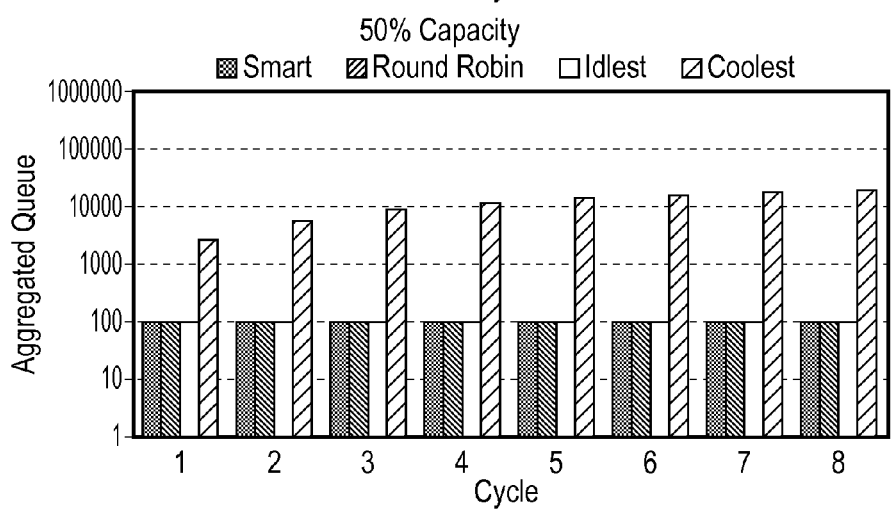
Figure 2C:
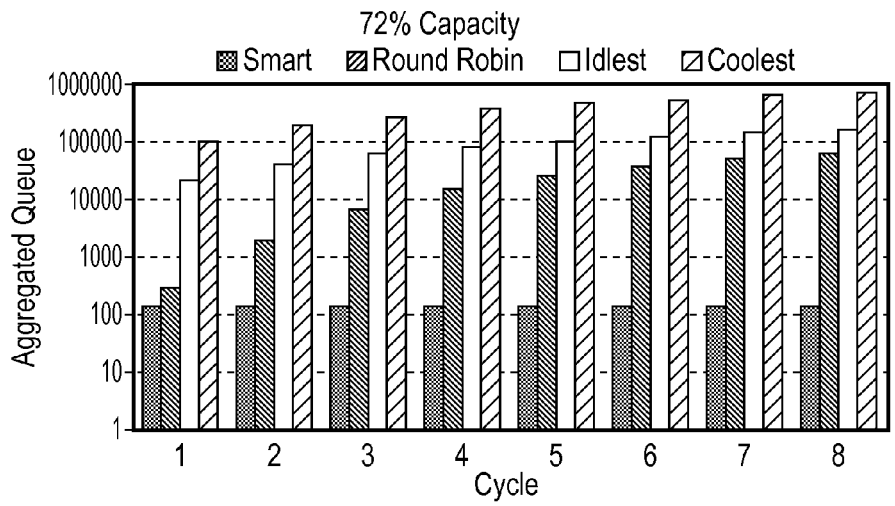

FIGS. 2a-2c show a performance comparison between the above four allocation algorithms for increasing constant workload. The bars show the longest aggregated queue per cycle which, in these tests was a 1 day period.

As can be seen in FIG. 2a, when the simulated data-centre operates at 28% capacity, all four strategies are roughly equivalent. At 50% (FIG. 2b), the "Coolest" strategy is breaking down, as evidenced by substantially longer aggregated queue (jobs waiting to be processed). It should be noted however that for this workload, the situation is almost stabilizing (i.e. the length of the queue only increases marginally in the last few days of the numerical experiment).

At 72% capacity (FIG. 2c), only the "Smart" strategy manages to avoid entering an oscillatory regime caused by servers having to enter cool down mode in order to avoid overheating. As a result of this phenomenon, all other allocation algorithms end up with "exploding" job queues (note that the scale is logarithmic) due to the corresponding idling time.

Whilst the simulations above are informative, most realistic scenarios would include a cyclic element, i.e. jobs would typically arrive at a different rate at different times, resulting in periods of relative inactivity followed by bursts in demand. It is therefore important to test performance in this alternative scenario as it may cause some or all strategies to fail to stay out of the (undesirable) oscillatory regime during peaks.

When considering these simulations, the key questions are:
  a) Are there some regions of the parameter space (e.g. average workload and amplitude of the variation) for which some algorithms manage to "hold on" (i.e. avoid overheating) when others fail?
  b) In the region(s) where all algorithms eventually start to fail, are any of them better at delaying the onset of oscillations and/or recovering after the peak?

Figure 3:
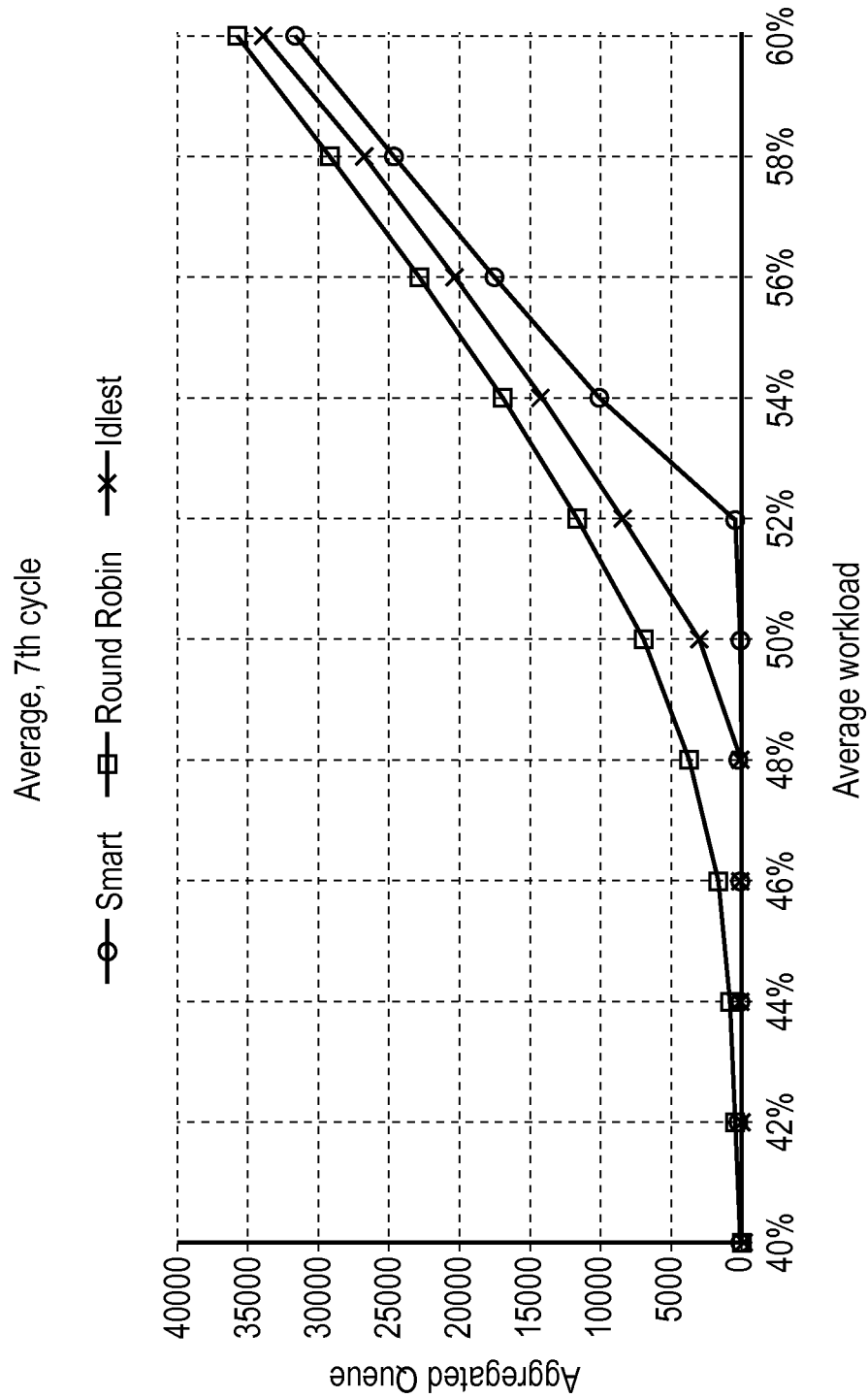
FIG. 3 shows a performance comparison between the three best allocation algorithms from the simulations in FIG. 2 tested under variable workload conditions.

FIG. 3 shows a performance comparison between the three best allocation algorithms from the previous simulations ("Idlest", "Round Robin" and "Smart") tested under variable workload conditions (sine-wave function, varying between 50% and 150% of the average demand). FIG. 3 plots the longest aggregated queue in the $7^{th}$ cycle (i.e. on day 7 of the simulation) for each algorithm at a range of average workloads.

From FIG. 3 it can be seen that the answer to question a) is clearly yes. For fluctuations of relatively high amplitude (demand varies between 0.5 and 1.5 times the mean workload), the "Smart" strategy manages to stay out of the oscillatory regime for an average workload equal or slightly superior to 50% capacity. However, all other strategies fail in this region of the parameter space.

The answer to question b) is more subtle. As soon as the system enters the oscillatory regime, whatever the allocation strategy, the number of jobs waiting to be processed quickly explodes (due to every machine alternating between active and idling/"cool down" mode and the total processing capability of the data-centre being reduced accordingly). As a result, the longest aggregated queue per cycle is no longer the most informative variable.

Figure 4A:
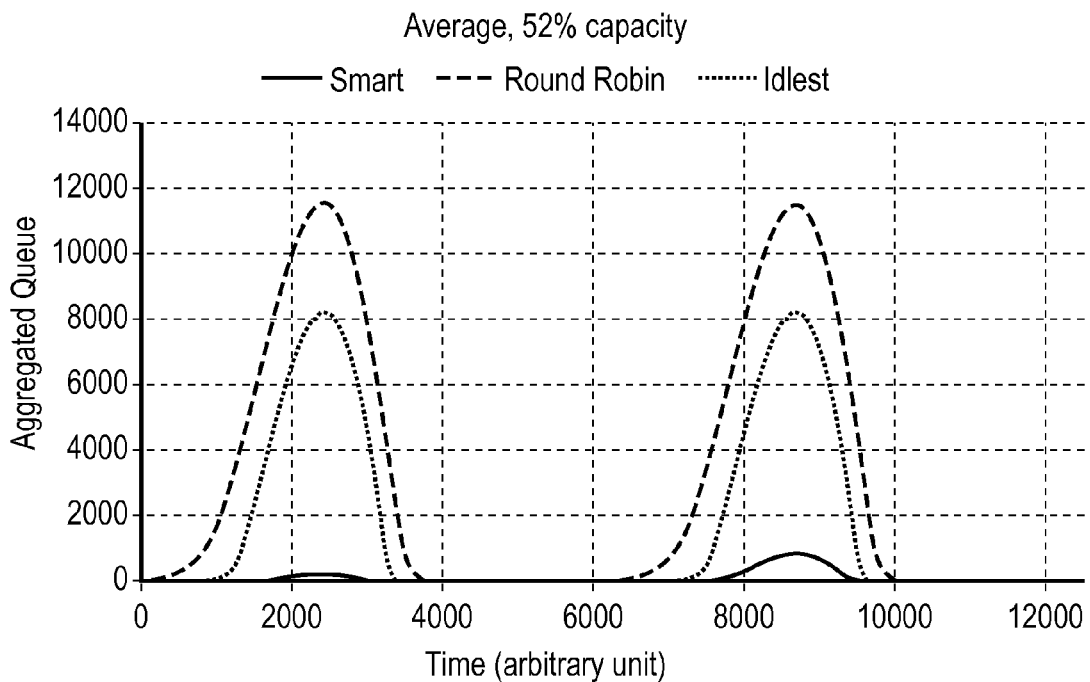
FIGS. 4a and 4b show an alternative performance comparison between the three allocation algorithms considered in FIG. 3, showing the average aggregated queue over the first two cycles for each of the algorithms at different average capacities.
Figure 4B:
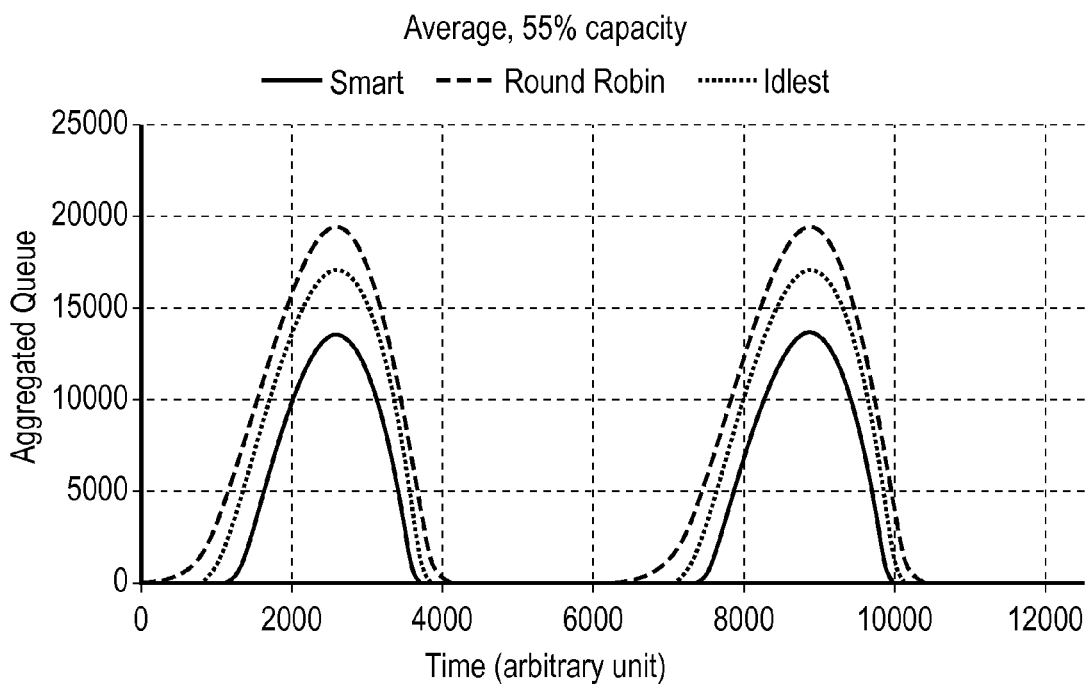

FIGS. 4a and 4b show an alternative performance comparison between the three allocation algorithms considered in FIG. 3 under the same variable workload conditions (sine-wave function, amplitude equal to average demand). FIG. 4a shows the average aggregated queue over the first two cycles for each of the algorithms at an average 52% capacity and FIG. 4b shows the same results at 55% capacity.

From FIGS. 4a and 4b, there is clearly a correlation between the delay before the onset of oscillations and the maximum length of the queue, but its nonlinear nature may hide the fact that for parameter values (e.g. average workload) for which all strategies eventually break down, some allocation algorithms may fare substantially better than others in the early stages of the "busy" period. As shown in FIG. 4, this is the case for the "Smart" strategy, which manages to delay the surge even when it cannot prevent it (see FIG. 4b, when demand fluctuates around 55% capacity), as well as limiting the peak aggregated queue.

The simulation results above clearly demonstrate that the "Smart" algorithm according to an embodiment of the present invention outperforms the obvious alternatives on almost every aspect.

Of course, these simulations relate to specific conditions, in particular that they simulate the case of a data-centre relying exclusively on fresh-air cooling and in which "forced" idling time is used to dissipate heat.

However, one could imagine a variety of hybrid scenarios in which active cooling could be called upon once the system threatens to enter the damaging oscillatory regime. In this respect, the ability of algorithms according to embodiments of the present invention to delay the onset of such a regime is of particular interest as it would basically allow the data-centre to operate longer under fresh air cooling conditions, therefore reducing power consumption and carbon emissions.

Using a load value calculated according to equation [1] appears to yield good results for the reasons set out below.

Ignoring irrelevant complexities, the standard heat exchange equation states that $T_t = T_{ambient} - (T_{ambient} - T_0)e^{-at}$. So the temperature rise or drop rate is proportional to the temperature gradient and over time there is a standard exponential decay towards equalising temperatures. The queue length is a direct embodiment of time because on average queue length directly (linearly) translates into how much processing time is needed to clear the queue. Hence equation [1] provides an estimation of the processor temperature after the queue is cleared or, in other words, it expresses the total thermal energy of the processor system which includes both the explicit thermal energy in terms of temperature and the implicit thermal energy which is condensed in the queue. Therefore, by using the load value calculated according to equation [1], the load balancer allocates the job to the server with the coolest 'effective' temperature or minimum total thermal energy.

However, the present invention is not limited to calculations of load values according to equation [1]. Alternative ways of calculating a load value which exhibit similar properties are also usable in embodiments of the present invention.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display (for example in the design of the business process). The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1] Gillan, P. A.; "Fresh air-natural asset [telecommunication equipment cooling]," Telecommunications Energy Conference, 2002. TNTELEC. 24th Annual International, vol., no., pp. 470-477, 2002 DOI: 10.1109/IN-TLEC.2002.1048698

[2] Prithviraj Banerjee, Chandrakant Patel, Cullen Bash, Amip Shah, and Martin Arlitt. 2012. Towards a net-zero data center. J. Emerg. Technol. Comput. Syst. 8, 4, Article 27 (November 2012), 39 pages. DOI=10.1145/2367736.2367738

[3] Lei Li, Chieh-Jan Mike Liang, Jie Liu, Suman Nath, Andreas Terzis, and Christos Faloutsos. 2011. Thermo-Cast: a cyber-physical forecasting model for datacenters. In Proceedings of the 17th ACM SIGKDD international conference on Knowledge discovery and data mining (KDD '11). ACM, New York, N.Y., USA, 1370-1378. DOI=10.1145/2020408.2020611

[4] Andy Woods. 2010. Cooling the Data Center. Queue 8, 3, Pages 10 (March 2010), 10 pages. DOI=10.1145/1737923.1737963

[5] Luca Parolini, Niraj Tolia, Bruno Sinopoli, and Bruce H. Krogh. 2010. A cyber-physical systems approach to energy management in data centers. In Proceedings of the 1st ACM/IEEE International Conference on Cyber-Physical Systems (ICCPS '10). ACM, New York, N.Y., USA, 168-177. DOI=10.1145/1795194.1795218

[6] Yogendra Joshi, Pramod Kumar, 2012. Energy Efficient Thermal Management of Data Centers, in Emerging Data Center Thermal Management and Energy Efficiency Technologies Springer 2012, pp 569-611 Print ISBN 978-1-4419-7123-4, DOI 10.1007/978-1-4419-7124-1_13

[7] D. Atwood and J. G. Miner. Reducing Data Center Cost with an Air Economizer, 2008. http://www.intel.com/it/pdf/Reducing_Data)Center_Cost_with_an_Air_Economizer.pdf

[8] Mikko Pervila and Jussi Kangasharju. 2011. Cold air containment. In Proceedings of the 2nd ACM SIGCOMM workshop on Green networking (GreenNets '11). ACM, New York, N.Y., USA, 7-12. DOI=10.1145/2018536.2018539

[9] C. Belady. Intense Computing or In Tents Computing?, 2008. http://blogs.msdn.com/b/the_power_of_software/archive/2008/09/19/intense-computing-or-in-tents-computing.aspx

[10] Patterson, M. K.; "The effect of data center temperature on energy efficiency," Thermal and Thermomechanical Phenomena in Electronic Systems, 2008. ITHERM 2008. 11th Intersociety Conference on, vol., no., pp. 1167-1174, 28-31 May 2008 DOI: 10.1109/ITHERM.2008.4544393

All references referred to above are hereby incorporated by reference.

What is claimed is:

1. A method for allocating jobs to a plurality of servers, wherein the jobs are tasks to be performed by the servers, the method comprising the steps of:
   receiving a job to be allocated;
   determining information relating to the state of each of the servers, the information comprising the temperature of each server and the amount of tasks allocated to the server and still to be performed by the server;
   calculating a thermal load of each server using both the temperature of the server and the amount of tasks allocated to the server and still to be performed by the server;
   choosing the server to allocate the job to according to the calculated thermal loads of the servers, wherein the step of choosing chooses the server with the lowest calculated thermal load; and
   allocating the job to the chosen server; and
where the thermal load of each server is calculated as:

$$ThermalLoad = Temperature \times e^{queueLength}$$

wherein queueLength is a representation of the amount of tasks allocated to the server and still to be performed by the server.

2. A method according to claim 1 where the temperature of the server which is determined is the temperature of a CPU in the server.

3. A method according to claim 1 including the further steps of:
   switching a server to an idle state if the temperature of that server exceeds an upper temperature threshold; and
   switching a server in an idle state to an active state when the server temperature reaches a lower temperature threshold.

4. A system for allocating jobs to a plurality of servers, wherein the jobs are tasks to be performed by the servers, the system including:
   a load balancer;
   a plurality of servers, each having a temperature sensor arranged to measure the temperature of the server; and
   a network connecting said servers and said load balancer,
   wherein the system is arranged to:
      determine information relating to the state of each of the servers, the information comprising the temperature of each server and the amount of tasks allocated to the server and still to be completed by the server; and
      calculate a thermal load of each server using both the temperature of the server and the amount of tasks allocated to the server and still to be performed by the server,
   and the load balancer is arranged to:
      receive a job to be allocated;
      choose a server to allocate the job to according to the calculated thermal loads of the servers, wherein the load balancer chooses the server with the lowest calculated thermal load to allocate the job to; and
      allocate the job to the chosen server; and
   where the thermal load of each server is calculated as:

$$ThermalLoad = Temperature \times e^{queueLength}$$

wherein queueLength is a representation of the amount of tasks allocated to the server and still to be performed by the server.

5. A system according to either claim 4 where the temperature sensors measure the temperature of a CPU in each server.

6. A system according to claim 4, wherein if the temperature of a server exceeds an upper temperature threshold, the server switches to an idle state until the server temperature reaches a lower temperature threshold when it switches to an active state.

7. A system according to claim 6 further including active cooling apparatus, wherein the active cooling apparatus actively cools a server which is running idle.

8. A system according to claim 4 wherein the load balancer is also a server.

9. A load balancing device for allocating jobs to a plurality of servers, wherein the jobs are tasks to be performed by the servers, the load balancing device having a processor and being arranged to:
   receive a job to be allocated to a server, and
   receive information from each of the servers, the information comprising the temperature of the server, and the amount of tasks allocated to the server and still to be completed by the server,
   and wherein the processor:
      calculates a thermal load of each server using both the temperature of the server and the amount of tasks allocated to the server and still to be performed by the server;
      chooses a server to allocate the job to according to the calculated thermal loads of the servers, wherein the processor chooses the server with the lowest thermal load to allocate the job to; and
      allocates the job to said chosen server; and
   wherein the processor calculates the thermal load of each server as:

$$ThermalLoad = Temperature \times e^{queueLength}$$

wherein queueLength is a representation of the amount of tasks allocated to the server and still to be performed by the server.

10. A load balancing device according to claim 9 wherein the temperature of each server is the temperature of a CPU in the server.

\* \* \* \* \*